US011725339B2

(12) United States Patent
Stoyanov et al.

(10) Patent No.: US 11,725,339 B2
(45) Date of Patent: *Aug. 15, 2023

(54) REDUCED FURFURAL CONTENT IN POLYACRYLIC ACID CROSSLINKED CELLULOSE FIBERS

(71) Applicant: International Paper Company, Memphis, TN (US)

(72) Inventors: Angel Stoyanov, Federal Way, WA (US); Joerg Endres, Schwalbach (DE); Holger Beruda, Schwalbach (DE); Ludwig Busam, Schwalbach (DE)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/788,165

(22) Filed: Feb. 11, 2020

(65) Prior Publication Data

US 2020/0181840 A1    Jun. 11, 2020

Related U.S. Application Data

(63) Continuation of application No. 15/829,745, filed on Dec. 1, 2017, now abandoned, which is a continuation of application No. 14/271,146, filed on May 6, 2014, now abandoned.

(51) Int. Cl.
*D21C 9/16* (2006.01)
*D21C 9/00* (2006.01)
*D21H 17/38* (2006.01)
*B01J 20/26* (2006.01)

(52) U.S. Cl.
CPC .............. *D21C 9/163* (2013.01); *B01J 20/26* (2013.01); *D21C 9/005* (2013.01); *D21H 17/38* (2013.01)

(58) Field of Classification Search
CPC ........ D21C 9/002; D21C 9/005; D21C 9/163; D21H 17/38
See application file for complete search history.

(56) References Cited

U.S. PATENT DOCUMENTS

| 5,137,537 | A | 8/1992 | Herron et al. |
|---|---|---|---|
| 5,183,707 | A | 2/1993 | Herron et al. |
| 5,190,563 | A | 3/1993 | Herron et al. |
| 5,308,896 | A | 5/1994 | Hansen et al. |
| 5,447,977 | A | 9/1995 | Hansen et al. |
| 5,549,791 | A | 8/1996 | Herron et al. |
| 5,562,740 | A | 10/1996 | Cook et al. |
| 5,756,721 | A | 5/1998 | Eden et al. |
| 5,998,511 | A | 12/1999 | Westland et al. |
| 6,066,774 | A | 5/2000 | Roe |
| 6,306,251 | B1 | 10/2001 | Jewell et al. |
| 6,620,865 | B2 | 9/2003 | Westland et al. |
| 7,513,973 | B2 | 4/2009 | Stoyanov et al. |
| 8,282,774 | B2 | 10/2012 | Tan et al. |
| 8,609,895 | B2 | 12/2013 | Saladino et al. |
| 9,205,405 | B2 | 12/2015 | Endres et al. |
| 2005/0217810 | A1 | 10/2005 | Stoyanov |
| 2007/0020452 | A1 | 1/2007 | Hamed et al. |
| 2007/0270070 | A1 | 11/2007 | Hamed |

FOREIGN PATENT DOCUMENTS

| CA | 1139507 A | 1/1986 |
|---|---|---|
| CN | 1191002 A | 8/1998 |
| CN | 1355814 A | 6/2002 |
| CN | 1676742 A | 10/2005 |
| CN | 103720539 A | 4/2014 |
| EP | 1 582 624 A1 | 10/2005 |
| EP | 2 305 881 A | 4/2011 |
| JP | H01-266293 A | 10/1989 |
| JP | 2001-64874 A | 3/2001 |
| JP | 2005-290655 A | 10/2005 |
| WO | 2004063461 A1 | 7/2004 |
| WO | 2006109842 A1 | 10/2006 |
| WO | WO-2010027556 A1 | 3/2010 |
| WO | WO-2015171653 A1 | 11/2015 |

OTHER PUBLICATIONS

"What is the pH of H2O2 Solutions?", by US Peroxide: Technologies for a Clean Environment, created Oct. 21, 2009, downloaded from archive.org on Oct. 5, 2015.
Celso Foelkel, Modern Fiberlines in Latin America, 2006, TAPPI.
International Preliminary Report on Patentability dated Nov. 17, 2016, issued in corresponding International Application No. PCT/US2015/029308, filed May 5, 2015, 7 pages.
International Search Report dated Jul. 27, 2015, issued in corresponding International Application No. PCT/US2015/029308, filed May 5, 2015, 2 pages.
Notice of Rejection dated Jan. 24, 2019, issued in related Japanese Patent Application No. 2016-562896, filed May 5, 2015, 7 pages.
Extended European Search Report dated Jan. 5, 2018, issued in European Patent Application No. 15789333.0, filed May 5, 2015, 7 pages.
Extended European Search Report dated Oct. 14, 2019, issued in European Patent Application No. 19178339.8, filed May 5, 2015, 7 pages.

(Continued)

*Primary Examiner* — Anthony Calandra
(74) *Attorney, Agent, or Firm* — Thomas W. Barnes, III

(57) ABSTRACT

Bleached polyacrylic acid crosslinked cellulose fibers with reduced furfural content are disclosed. The reduced furfural content is accompanied by a strong reduction of malodor associated with crosslinked fibers. Methods of furfural reduction include treatment with hydrogen peroxide in the absence of alkaline or other bleaching agents subsequent to curing polyacrylic acid crosslinked cellulose fibers. Some embodiments of treated polyacrylic acid crosslinked cellulose fibers have a furfural content lower than 1.3 ppm. In some embodiments, the reduction of furfural content of the treated crosslinked fibers compared to untreated crosslinked fibers is at least 55%. in some embodiments, furfural content decreases with aging of the treated crosslinked fibers.

16 Claims, No Drawings

(56) References Cited

OTHER PUBLICATIONS

Notice of First Office Action dated Nov. 17, 2017, in Chinese Patent Application No. 201580021926.1, filed May 5, 2015, 21 pages.
Notice of Second Office Action dated Sep. 30, 2018, in Chinese Patent Application No. 201580021926.1, filed May 5, 2015, 7 pages.
Notice of Third Office Action dated Apr. 23, 2019, in Chinese Patent Application No. 201580021926.1, filed May 5, 2015, 23 pages.

REDUCED FURFURAL CONTENT IN POLYACRYLIC ACID CROSSLINKED CELLULOSE FIBERS

JOINT RESEARCH AGREEMENT

The presently claimed invention was made by or on behalf of the below listed parties to a joint research agreement. The joint research agreement was in effect on or before the date the claimed invention was made, and the claimed invention was part of the joint research agreement and made as a result of activities undertaken within the scope of the joint research agreement. The parties to the joint research agreement are (1) The Proctor & Gamble Company and (2) Weyerhaeuser NR Company.

TECHNICAL FIELD

This disclosure relates to polyacrylic acid crosslinked cellulose fibers, and in particular to reduction of furfural, and accompanying malodor, that is generated during the curing stage of the crosslinking process.

BACKGROUND

Cellulosic fibers are a basic component of absorbent products such as diapers. These fibers form a liquid absorbent structure, a key element of the absorbent product. Cellulosic fluff pulp, a form of cellulosic fibers, is a suitable fiber for this application because a high void volume, or high bulk, liquid absorbent fiber structure is provided. This structure, however, tends to collapse during wetting, and this reduction in fiber structure bulk reduces the volume of liquid that can be retained in the wetted structure, and also inhibits the wicking of liquid into the unwetted portion of the cellulose fiber structure. Consequently, the potential capacity of the dry high bulk fiber structure is not realized and it is the fiber structure's wet bulk that determines the liquid holding capacity of the overall fiber structure.

Fiber structures formed from crosslinked cellulosic fibers generally have enhanced wet bulk compared to those formed from uncrosslinked fibers. The enhanced bulk is a consequence of the stiffness, twist, and curl imparted to the fibers as a result of crosslinking. Accordingly, crosslinked fibers are advantageously incorporated into absorbent products to enhance their wet bulk.

Polycarboxylic acids have been used to crosslink cellulosic fibers. For example, absorbent structures containing individualized cellulosic fibers crosslinked with a C2-C9 polycarboxylic acid are described in U.S. Pat. Nos. 5,137,537, 5,183,707, and 5,190,563, among others. Absorbent structures made from these individualized, crosslinked fibers exhibit increased dry and wet resilience, and improved responsiveness to wetting, relative to structures containing uncrosslinked fibers. Furthermore, citric acid, a monomeric polycarboxylic acid, is available in large quantities at relatively low prices making it commercially competitive with formaldehyde and formaldehyde-addition products, or urea-glyoxal condensation products.

However, cellulosic fibers crosslinked with monomeric polycarboxylic acids such as citric acid tend to lose their crosslinks over time and revert to an uncrosslinked state. For example, citric acid crosslinked fibers show a considerable loss of crosslinks on storage. Such a reversion of crosslinking generally defeats the purpose of fiber crosslinking, which is to increase the fiber's bulk and capacity. Thus, the useful shelf-life of fibers crosslinked with these monomeric polycarboxylic acids is relatively short and renders the fibers somewhat limited in their utility.

In contrast, polymeric polycarboxylic acid crosslinked fibers, such as those disclosed, for example, in U.S. Pat. No. 6,620,865, exhibit a density that remains substantially unchanged over the lifetime of fibrous webs prepared from these fibers. This resistance to aging or reversion of density relates to the stable intrafiber crosslinks formed using such polymeric crosslinking agents. Cellulose fibers crosslinked with citric acid show a considerable increase in density, accompanied by a loss of bulk and absorbent capacity over time. Generally, the increase in density indicates a decrease in the level of crosslinking (i.e. reversion) in the fibers. In addition to density increase, the loss of crosslinking in the fibrous web results in a less bulky web and, consequently, diminished absorbent capacity and liquid acquisition capability.

Some crosslinking agents can cause discoloration, i.e. yellowing, of the white cellulosic fibers at the elevated temperatures required to effect the crosslinking reaction. A possible mechanism, at least for citric acid, is a dehydration reaction resulting in aconitic acid and a yellow coloration attributable to the C=C chromophore.

Widespread consumer demand for brighter, whiter pulp drives manufacturers to pursue methods for reducing discoloration. Bleaching, for example, is a common method for increasing pulp brightness (as defined by the Technical Association of the Pulp & Paper Industry ("TAPPI") or the International Organization for Standardization ("ISO")). Industrial practice for improving appearance of fluff pulp is to bleach the pulp to increase its brightness. Traditional bleaching agents include elemental chlorine, chlorine dioxide, and hypochlorites. However, bleaching, especially with chlorine-containing agents, can be environmentally harsh, expensive, and a source of manufacturing bottleneck. Accordingly, there have been many attempts to reduce the number, nature, and quantity of bleaching agents used in bleaching methods.

Also, while highly bleached pulps are "whiter" than less-bleached material, such pulps are often still yellow-white in color. Consumer studies indicate a clear preference for blue-white over yellow-white colors, as the former is perceived to be whiter, i.e. fresh, new, and clean, in comparison to the latter, which is considered to be old, faded, or dirty.

Addressing this preference, U.S. Pat. No. 7,513,973, for example, suggests that whiteness attribute, rather than TAPPI or ISO brightness, better correlates with consumer preference for product whiteness, and discloses bleaching methods that seek to improve the Whiteness Index of cellulosic fibers crosslinked with polymeric polycarboxylic crosslinking agents, such as methods that involve the use of sodium hydroxide and/or hydrogen peroxide.

It Is generally accepted that the active mechanism in chromophore elimination in bleaching operations that include hydrogen peroxide involves the perhydroxyl ion OOH. The formation of the perhydroxyl anion can be enhanced, for example, by increasing the pH during the bleaching stage, according to the following reaction:

$$H_2O_2 + OH^- \leftrightarrow OOH^- + H_2O$$

Accordingly, industry practice is to perform hydrogen peroxide bleaching in alkaline systems, such as by adding an alkaline agent (such as sodium hydroxide) in coordination with hydrogen peroxide in the bleaching stage.

In U.S. Pat. No. 5,562,740, the combination of an alkaline agent (such as sodium hydroxide) with an oxidizing agent (such as hydrogen peroxide) has been observed, in a bleaching stage at a pH of at least 5.5, to reduce the "smoky and burnt" odor of cellulosic fibers crosslinked with alpha-hydroxy carboxylic acid crosslinking agents such as citric acid, in addition to improving brightness. The '740 patent theorizes that the malodor is due to the collective presence of a host of substances including volatile phenolics, hydrogen sulfide, various sugar decomposition products (such as furfural, methyl furfural, and guaiacols), and citric acid anhydrides, and that the odor reduction may be due to the possible reduction of such substances by the combination of alkaline and oxidizing agents at a pH of at least 5.5.

Although this "burnt" odor originally became identified as a characteristic of citric acid crosslinked cellulosic fibers specifically, such as in the '740 patent, it has become known that the "burnt" odor also accompanies cellulosic fibers crosslinked with polymeric polycarboxylic acids, such as polyacrylic acid, as well.

Accordingly there remains a need for cellulose fibers crosslinked with polymeric polycarboxylic acids, which exhibit high bulk, increased brightness and whiteness, and reduced malodor.

SUMMARY

Various embodiments of bleached polyacrylic acid crosslinked cellulose fibers with reduced furfural content, as well as methods for reducing the furfural content of polyacrylic acid crosslinked cellulose fibers, by treatment of the crosslinked fibers with hydrogen peroxide, are disclosed herein.

Unexpectedly, it was found that a reduction in furfural levels was accompanied by a strong reduction of the "burnt" malodor associated with polyacrylic acid crosslinked cellulose fibers.

In one aspect, the present disclosure provides embodiments of polyacrylic acid crosslinked cellulosic fibers subsequently treated with hydrogen peroxide in the absence of sodium hydroxide, wherein the amount of furfural in the treated polyacrylic acid crosslinked fibers reduces from a first value determined at least one day after treatment of the polyacrylic acid crosslinked fibers to a second, subsequent value determined up to 21 days after treatment.

In one aspect, the present disclosure provides embodiments of polyacrylic acid crosslinked cellulosic fibers having less than about 1.3 ppm furfural, for example by having been subsequently treated with hydrogen peroxide in the absence of alkaline or other bleaching agents.

In one aspect, the present disclosure provides embodiments of polyacrylic acid crosslinked cellulosic fibers subsequently treated with hydrogen peroxide in the absence of alkaline of other bleaching agents, wherein the amount of furfural in the treated crosslinked fibers is reduced by at least 55% as compared with untreated polyacrylic acid crosslinked cellulosic fibers (that is, the same polyacrylic acid crosslinked cellulosic fibers except not given the aforementioned subsequent treatment).

In one aspect, the present disclosure provides methods of reducing the malodor associated with the presence of furfural in polyacrylic acid crosslinked fibers that include applying hydrogen peroxide in the absence of other bleaching agents to the crosslinked fibers subsequent to curing the crosslinked fibers.

In one aspect, the present disclosure provides methods of reducing the furfural content of polyacrylic acid crosslinked fibers, the method comprising applying hydrogen peroxide alone to polyacrylic acid crosslinked fibers, wherein the amount of furfural in the polyacrylic acid crosslinked fibers treated with hydrogen peroxide alone reduces from a first value determined at least one day after the treatment of the polyacrylic acid crosslinked fibers with hydrogen peroxide to a second, subsequent value determined up to 21 days after treatment with hydrogen peroxide.

The concepts, features, methods, and component configurations briefly described above are clarified with reference to the detailed description below.

DETAILED DESCRIPTION

Reference throughout this disclosure to "an embodiment" or "one embodiment," and so forth, indicates that a particular feature, step, technique, method, or other characteristic described in connection with the embodiment is included in at least one embodiment. However, references to "an embodiment" or "one embodiment" are not necessarily all referring to the same embodiment. Further, the particular features, steps, techniques, methods, and other characteristics may be combined in any suitable manner in one or more embodiments.

All of the references cited in this disclosure are each expressly incorporated herein by reference in their entirety.

As noted above, although a "burnt" odor has been identified as a characteristic of citric acid crosslinked cellulosic fibers specifically, it has become known that the malodor also accompanies cellulosic fibers crosslinked with polymeric polycarboxylic acids, such as polyacrylic acid, as well.

It is found that furfural in cellulose fibers crosslinked with polymeric polycarboxylic acids is reduced by treatment of the fibers subsequent to crosslinking with hydrogen peroxide. In one embodiment, the extent of furfural reduction is increased when hydrogen peroxide is used in the absence of sodium hydroxide or other alkaline agents relative to the extent of furfural reduction in the presence of such agents. It is also unexpectedly found that a reduction in furfural levels is accompanied by a strong reduction of the malodor associated with the fibers. Accordingly, it is theorized that furfural is the main odoriferous volatile organic compound causing the malodor, and that treatment with hydrogen peroxide replaces the compound with reaction products that impart a clean, fresh odor. Hemicellulose, which accompanies the cellulose fibers obtained from wood during the pulping process, is considered the main source for furfural generation during thermal treatment (e.g., curing) of the cellulose fibers, according to the following proposed mechanism.

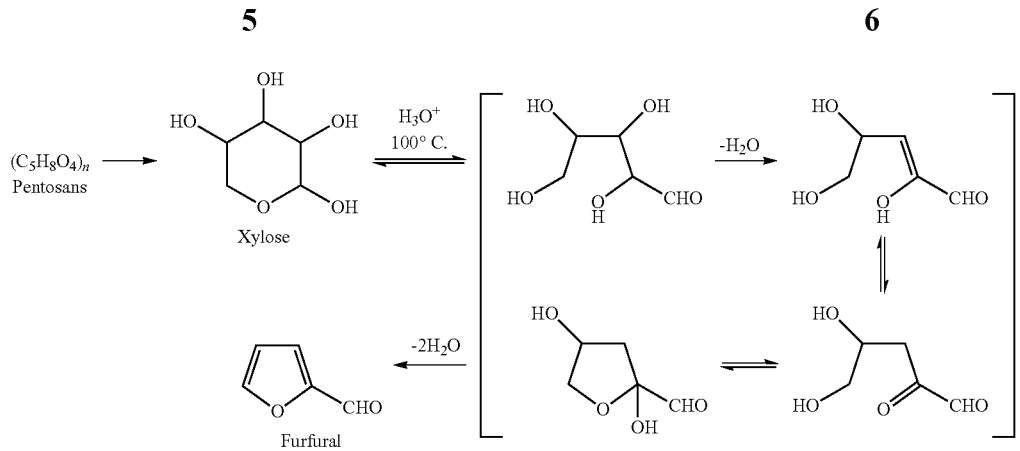

Thus, in one aspect, the present disclosure provides embodiments of polyacrylic acid crosslinked cellulosic fibers subsequently treated with hydrogen peroxide, wherein the amount of furfural in the treated polyacrylic acid crosslinked fibers reduces from a first value determined at least one day after treatment of the polyacrylic acid crosslinked fibers to a second, subsequent value determined up to 21 days after treatment.

It is also found that in some cases, the furfural reduction with hydrogen peroxide in the absence of an alkaline agent such as sodium hydroxide is more pronounced when compared to subsequent treatment with hydrogen peroxide in the presence of such an alkaline agent. Thus, contrary to expectation, it was found that pH adjustment of the crosslinked fibers to at least 5.5, such as by use of an alkaline agent such as sodium hydroxide, is not required to effect the reduction of furfural and accompanying malodor, thereby potentially reducing the use of (or need for) such agents in the bleaching process.

The bleached polyacrylic acid crosslinked fibers discussed herein are made from polyacrylic acid crosslinked cellulosic fibers. These crosslinked cellulosic fibers are obtained by treating cellulosic fibers with an amount of a polyacrylic acid crosslinking agent to provide intrafiber crosslinked cellulosic fibers having increased bulk.

Polyacrylic acid crosslinked cellulosic fibers and methods for making polyacrylic acid crosslinked cellulosic fibers are described in U.S. Pat. Nos. 5,549,791, 5,998,511, 6,306,251, for example, and bleached polyacrylic acid crosslinked cellulosic fibers are described in U.S. Pat. No. 7,513,973.

Polyacrylic acid crosslinked cellulosic fibers can be prepared by applying polyacrylic acid to the cellulosic fibers in an amount sufficient to achieve intrafiber crosslinking. The amount applied to the cellulosic fibers can be from about 1 to about 10 percent by weight based on the total weight of fibers. In one embodiment, crosslinking agent in and amount from about 4 to about 6 percent by weight based on the total weight of dry fibers is applied.

Polyacrylic acid crosslinked cellulosic fibers can be prepared using a crosslinking catalyst. Suitable catalysts can include acidic salts, ammonium sulfate, and alkali metal salts of phosphorous-containing acids. In one example, the crosslinking catalyst is sodium hypophosphite. The amount of catalyst used can vary from about 0.1 to about 5 percent by weight, based on the total weight of dry fibers.

Although available from other sources, cellulosic fibers useful for making the bleached polyacrylic acid crosslinked cellulosic fibers in accordance with the present disclosure are derived primarily from wood pulp. Suitable wood pulp fibers for use with the invention can be obtained from well-known chemical processes such as the kraft and sulfite processes, with or without subsequent bleaching. The pulp fibers may also be processed by thermomechanical, chemi-thermomechanical methods, or combinations thereof. Usually the pulp fiber is produced by chemical methods, although ground wood fibers, recycled or secondary wood pulp fibers, and bleached or unbleached wood pulp fibers can be used. A suitable starting material is prepared from long-fiber coniferous wood species, such as Southern pine, Douglas fir, spruce, and hemlock. Details of the production of wood pulp fibers are known to those skilled in the art. Suitable fibers are commercially available from a number of companies, including the Weyerhaeuser Company. For example, suitable cellulose fibers produced from southern pine that are usable in making the present invention are available from the Weyerhaeuser Company under the designations CF416, CF405, NB416, NF405, FR416, and FR516.

Wood pulp fibers suitable for use in accordance with the present disclosure can also be pretreated prior to use. This pretreatment may include physical treatment, such as subjecting the fibers to steam, or chemical treatment. Although not to be construed as a limitation, examples of pretreating fibers include the application of fire retardants to the fibers, and surfactants or other liquids, such as solvents, which modify the surface chemistry of the fibers. Other pretreatments include incorporation of antimicrobials, pigments, and densification or softening agents. Fibers pretreated with other chemicals, such as thermoplastic or thermosetting resins may be used as well. Another kind of physical pretreatment is subjecting the fibers to plasma, including corona discharge, to improve the impregnation process of the crosslinking agent. Combinations of pretreatments may also be employed.

Polyacrylic acid crosslinked cellulosic fibers suitable for use in accordance with the present disclosure may be prepared by a system and apparatus as described in U.S. Pat. No. 5,447,977, for example. The following description of the crosslinking process refers to this system as an illustrative example, although any suitable system may be employed. Briefly, the system includes a conveying device for transporting a mat or web of cellulose fibers through a fiber treatment zone; an applicator for applying a treatment substance from a source to the fibers at the fiber treatment zone; a fiberizer for separating the individual cellulose fibers comprising the mat to form a fiber output comprised of substantially unbroken and essentially singulated cellulose fibers; a dryer coupled to the fiberizer for flash evaporating residual moisture; and a controlled temperature zone for additional heating of fibers and an oven for curing the crosslinking agent, to form dried and cured individualized crosslinked fibers.

As used herein, the term "mat" refers to any nonwoven sheet structure comprising cellulose fibers or other fibers that are not covalently bound together. The fibers include fibers obtained from wood pulp or other sources including cotton rag, hemp, grasses, cane, cornstalks, cornhusks, or other suitable sources of cellulose fibers that may be laid into a sheet. The mat of cellulose fibers is preferably in an extended sheet form, and may be one of a number of baled sheets of discrete size or may be a continuous roll.

Each mat of cellulose fibers is transported by a conveying device, for example, a conveyor belt or a series of driven rollers. The conveying device carries the mats through the fiber treatment zone. At the fiber treatment zone, a crosslinking agent solution is applied to the mat of cellulose fibers. The crosslinking agent solution is applied to one or both surfaces of the mat using any one of a variety of methods known in the art, including spraying, rolling or dipping. Once the crosslinking agent solution has been applied to the mat, the solution may be uniformly distributed through the mat, for example, by passing the mat through a pair of rollers.

After the mat's fibers have been treated with the crosslinking agent, the impregnated mat is fiberized by feeding the mat through a hammermill. The hammermill disintegrates the mat into its component individual cellulose fibers, which are then air conveyed through a drying unit to remove the residual moisture. In a preferred embodiment, the fibrous mat is wet fiberized.

The resulting treated pulp is then air conveyed through an additional heating zone (e.g. a dryer) to bring the temperature of the pulp to the cure temperature. In one embodiment, the dryer includes a first drying zone for receiving the fibers and removing residual moisture from the fibers via a flash-drying method, and a second heating zone for curing the crosslinking agent, to allow the chemical reaction (esterification, in this embodiment), to be completed. Alternatively, in another embodiment, the treated fibers are blown through a flash-dryer to remove residual moisture, heated to a curing temperature, and then transferred to an oven where the treated fibers are subsequently cured. Overall, the treated fibers are dried and then cured for a sufficient time and at a sufficient temperature to achieve crosslinking. Typically, the fibers are oven-dried and cured for about 1 to about 20 minutes at a temperature from about 120° C. to about 200° C. The pH of the fibers is generally around 4.5 to 5.

A bleaching stage typically follows the curing stage. In one aspect, this disclosure provides methods for making bleached polyacrylic acid crosslinked cellulosic fibers. In such methods, polyacrylic acid crosslinked cellulosic fibers are subsequently treated—that is, treated after crosslinking reaction is completed and the fibers are cured—with one or more bleaching agents to provide polyacrylic add crosslinked cellulosic fibers having reduced amounts of furfural, and accompanying reduced malodor.

The bleaching agent is applied to the polyacrylic acid crosslinked cellulosic fibers. In one embodiment, the bleaching agent is hydrogen peroxide. In another embodiment, the bleaching agent is a combination of hydrogen peroxide and sodium hydroxide. Other possible bleaching agents include peroxy acids (e.g. peracetic acid), sodium peroxide, chlorine dioxide, sodium chlorite, and sodium hypochlorite. Mixture of bleaching agents may also be used. Due to environmental and health concerns, bleaching agents other than chlorine-containing agents are generally preferred.

The polyacrylic acid crosslinked cellulosic fibers can be treated with from about 0.1 pounds (0.045 kg) to about 20 pounds (9.07 kg) hydrogen peroxide per air dried metric ton of fiber. An air dry metric ton, also referred to as "ADMT" (2204.6 lbs, or 1000 kg), is a weight measurement for wood pulp. Per TAPPI standards, an air dry metric ton has a dry solids (fiber) content of 90%. Thus the aforementioned range corresponds to about 0.005 wt % to about 1.01 wt % chemical on pulp ("COP"). In some embodiments, the fibers are treated with from about 3 pounds (1.36 kg) to about 10 pounds (4.54 kg) hydrogen peroxide per ADMT of fiber (about 0.15 wt % to about 0.5 wt % COP). In some embodiments, the fibers are treated with about 5 pounds (2.27 kg) hydrogen peroxide per ADMT of fiber (about 0.25 wt % COP). The amount of hydrogen peroxide may, in some environments, be limited by factors such as safe chemical handling practice, application method(s), application apparatus, and so forth. However, the disclosure is not so limited, and encompasses any level of hydrogen peroxide effective to reduce furfural levels in polyacrylic acid crosslinked cellulose fibers.

In one embodiment of the method, the bleaching agent is applied to polyacrylic acid crosslinked cellulosic fibers immediately after curing by spraying hydrogen peroxide onto the fibers by any suitable means. In a lab environment, this may be accomplished by spraying moistened polyacrylic acid crosslinked fibers placed into a mylar aluminum sealable bag with an aqueous solution of hydrogen peroxide. In a mill environment, this can be accomplished by spraying an aqueous solution of hydrogen peroxide into an air stream containing polyacrylic acid crosslinked fibers. Any suitable application method may be used.

In some embodiments, the hydrogen peroxide is applied to polyacrylic acid crosslinked cellulosic fibers in the presence of alkaline agents such as sodium hydroxide. For example, in some embodiments, up to 5 pounds sodium hydroxide per ADMT of fiber can be applied to the fibers together with the hydrogen peroxide. In other embodiments, the hydrogen peroxide is applied in the absence of sodium hydroxide, and/or in the absence of any alkaline or other bleaching agents. In such embodiments, the pH of the hydrogen peroxide solution applied to the fibers is between about 4.5 and 5. As shown below, furfural content was observed, in some experiments, to be reduced to a greater extent after hydrogen peroxide application in the absence of sodium hydroxide, as compared to hydrogen peroxide application in the presence of sodium hydroxide. In some embodiments, hydrogen peroxide is applied to polyacrylic acid crosslinked cellulosic fibers alone, that is, in the absence of any other chemical compound or reagent besides water.

Furfural amount or content can be measured by any suitable method, such as standard GC-FID methods or otherwise, and the reduction of furfural content can be calculated by comparing the content measured at two (or more) different times after furfural is initially generated. Due to the different reaction rates of initial furfural generation and subsequent furfural reduction, it was found that furfural measurements were best taken at two points between 1 and 21 days after hydrogen peroxide treatment. For example, in a mill environment, it is typical that the cured fibers, after bleaching, are baled while still retaining heat from the curing stage, and thus it is possible that this residual heat may prolong the furfural generation reaction (even after hydrogen peroxide treatment and initiation of the furfural reduction reaction) until the fibers have cooled. Accordingly, initial furfural measurements were taken at least one day after treatment with hydrogen peroxide. The subsequent furfural measurements were taken after allowing the bleached polyacrylic acid crosslinked cellulosic fibers to be aged, to assure sufficient time for the hydrogen peroxide reduction of furfural content to reach equilibrium. In a production setting, the aging may take place as the fibers are processed or handled after treatment. For example, in a mill environment, after bleaching, the crosslinked fibers are typically conveyed to a baling device in which the product fibers are baled and wrapped prior to shipment.

The aforementioned example embodiments are illustrative of any number of suitable application methods, as well as combinations thereof, all of which are understood to be encompassed by the present disclosure.

The following examples describe illustrative, non-limiting embodiments and methods of subsequently treating polyacrylic acid crosslinked cellulosic fibers with hydrogen peroxide in amounts effective to reduce the amount of furfural (and accompanying malodor) in the crosslinked fibers.

Example 1

Samples of polyacrylic acid crosslinked cellulose fibers were prepared on lab scale by treating southern pine kraft pulp fibers (CF416, Weyerhaeuser Co.) with polyacrylic acid (Aquaset 1676, Dow). All samples were treated with a standard crosslinking solution and cured at 193° C. (380° F.) for 5 minutes. The cured fibers were remoisturized either with distilled water (as control) or with water containing the bleaching agent hydrogen peroxide ($H_2O_2$) at concentrations of 2.5, 5.0, 7.5, and 10.0 lbs/ADMT of fiber (1.13, 2.27, 3.40, and 4.54 kg/ADMT, respectively). The pH of distilled water was 4.46, and that of the respective $H_2O_2$ solutions were 4.93, 4.72, 4.80, and 4.65.

The following procedure using GC-FID equipment was used for measuring the amount of furfural generated in the polyacrylic acid crosslinked cellulosic fibers and its reduction after the application of bleaching agent, i.e. hydrogen peroxide.

One gram of the pulp sample was inserted into a 20 ml vial, capped and heated for 10 minutes at 85° C. in a Headspace Sampler (HP 7694). Volatile compounds are driven off of the pulp into the headspace in the form of vapors. The Headspace Sampler injects the gas sample, via a 0.5 ml sample loop, onto a HP 5890 Series II Gas Chromatograph (GC). A 30 meter megabore column (DB624 0.054 mm ID, 3.0 micron film thickness) separates the compounds by a combination of boiling point, molecular weight and vapor pressure—as the GC oven heats up, the compounds elute off of the column and are detected by a flame ionization detector (FID). The resulting graph is represented by distinct peaks over the time of the analysis. The data is acquired by HP Chemstation software and analyzed by Thermo Target Software. The compound is identified by its unique retention time and the intensity (the peak area) indicates the amount. For furfural, nine different concentrations were used to generate a calibration curve, with a range from 0.02-12 µg/g (ppm). The calibration curve had a regression of R squared of 0.999.

Post-treatment furfural levels of the samples are shown in Table 1, below. "Day 0" indicates day of production and subsequent bleaching treatment.

TABLE 1

| Sample | Bleach treatment (lbs (kg)/ADMT) | | Amount of furfural (µg/g (ppm)) | | | |
|---|---|---|---|---|---|---|
| | $H_2O_2$ | NaOH | Day 0 | Day 1 | Day 5 | Day 12 |
| 1A | 0.0 | 0.0 | 2.9 | — | — | — |
| 1B | 2.5 (1.13) | 0.0 | 2.7 | 2.5 | 2.3 | 1.3 |
| 1C | 5.0 (2.27) | 0.0 | 2.5 | 2.3 | 2.1 | 1.2 |
| 1D | 7.5 (3.40) | 0.0 | 2.4 | 2.4 | 2.2 | 1.9 |
| 1E | 10.0 (4.54) | 0.0 | 2.2 | 2.1 | 1.9 | 1.7 |

Furfural content of the treated samples (1B, 1C, 1D, and 1E) at Day 1, compared to that of the untreated control sample (1A), generally decreased as the amount of hydrogen peroxide applied increased, with reductions of approximately 14%, 21%, 17%, and 28% observed at the 2.5, 5.0, 7.5, and 10.0 lbs/ADMT (1.13, 2.27, 3.40, and 4.54 kg/ADMT) of fiber levels, respectively.

With aging, the greatest amount of furfural reduction was observed in samples 1B and 1C, at the 2.5 and 5.0 lbs/ADMT (1.13 and 2.27 kg/ADMT) of fiber levels, respectively. At each of these two levels, furfural content was reduced by approximately 48% between Day 1 and Day 12.

Overall, the furfural reduction compared to the untreated control sample (1A) was greatest in samples 1B and 1C, at the 2.5 and 5.0 lbs/ADMT (1.13 and 2.27 kg/ADMT) of fiber levels, respectively, at Day 12. At these levels, furfural content was reduced in sample 18 by approximately 55% compared to the untreated control sample, and in sample 1C by approximately 59% compared to the untreated control sample.

Example 2

Samples of polyacrylic acid crosslinked cellulose fibers were prepared on lab scale according to the procedure described in Example 1. However, after treatment with crosslinking solution, samples were cured at 193° C. (380° F.) for 10 minutes in order to enhance initial levels of furfural resulting from curing. The cured fibers were remoisturized either with water (control), or with water containing the bleaching agent hydrogen peroxide ($H_2O$) at concentrations of 2.5, 5.0, 7.5, and 10.0 lbs/ADMT (1.13, 2.27, 3.40, and 4.54 kg/ADMT) of fiber. Some cured fibers were treated with water containing $H_2O_2$ (at concentrations of 2.5 and 5.0 lbs/ADMT (1.13 and 2.27 kg/ADMT) fiber) and sodium hydroxide (NaOH) (at a concentration of either 2.5 or 5.0 lbs/ADMT (1.13 or 2.27 kg/ADMT) fiber).

Post-treatment furfural levels of the samples, determined by the GC-FID procedure described in Example 1, are shown in Table 2, below.

TABLE 2

| Sample | Bleach treatment (lbs (kg)/ADMT) | | Amount of furfural (µg/g (ppm)) | | | |
|---|---|---|---|---|---|---|
| | $H_2O_2$ | NaOH | Day 0 | Day 1 | Day 7 | Day 14 |
| 2A | 0.0 | 0.0 | 6.5 | — | — | — |
| 2B | 2.5 (1.13) | 0.0 | 4.4 | 4.4 | 3.5 | 3.1 |
| 2C | 2.5 (1.13) | 2.5 (1.13) | 4.4 | 4.2 | 3.4 | 2.9 |
| 2D | 5.0 (2.27) | 0.0 | 4.7 | 4.2 | 3.7 | 3.1 |
| 2E | 5.0 (2.27) | 2.5 (1.13) | 4.8 | 4.3 | 3.4 | 3.6 |
| 2F | 5.0 (2.27) | 5.0 (2.27) | 3.9 | 3.9 | 3.5 | 3.2 |
| 2G | 7.5 (3.40) | 0.0 | 4.2 | 3.5 | 3.1 | 2.9 |
| 2H | 10.0 (4.54) | 0.0 | 2.8 | 3.2 | 3.3 | 2.5 |

Again, furfural content of the treated samples generally decreased as the amount of hydrogen peroxide applied increased, comparing Day 1 values to that of the untreated control sample (2A), with reductions ranging from approximately 32% (in sample 2H) to approximately 51% (in sample 2H). Furfural content at Day 1 was slightly less in the samples treated with sodium hydroxide in addition to hydrogen peroxide, as compared with the samples treated with the same amount of hydrogen peroxide alone.

With aging, as with Example 1, the greatest amount of furfural reduction was observed at the 2.5 and 5.0 lbs/ADMT (1.13 and 2.27 kg/ADMT) of fiber levels. At the lower of these levels, the extent of furfural reduction from Day 1 to Day 14 was slightly greater in the presence of sodium hydroxide: approximately 30% in sample 2B (treated with $H_2O_2$ alone) vs. approximately 31% in sample 2C (treated with $H_2O_2$ in the presence of NaOH). However, at the higher of these levels, the extent of furfural reduction after Day 1 was lower in the presence of sodium hydroxide: approximately 26% in sample 2D (treated with $H_2O_2$ alone) vs. approximately 21% and 18% in samples 2E and 2F, respectively (treated with $H_2O_2$. In the presence of 2.5 and 5.0 lbs (1.13 and 2.27 kg) NaOH per ADMT of fiber, respectively).

Overall, in Example 2, the furfural reduction compared to the untreated control sample (2A) was greatest in sample 2I1 (at 10.0 lbs/ADMT (4.54 kg/ADMT) of fiber) at Day 14, at approximately 62%.

Example 3

A mill trial was conducted to apply varying levels of hydrogen peroxide to polyacrylic acid crosslinked cellulose fibers produced at the Weyerhaeuser Company's Columbus Modified Fiber mill in Columbus, Miss. The polyacrylic acid crosslinked fibers were produced from southern kraft pulp fibers (CF416, Weyerhaeuser Co.). Water, containing the bleaching agent hydrogen peroxide ($H_2O_2$) at concentrations of 2.5, 3.5, and 5.0 lbs/ADMT (1.13, 1.59 and 2.27 kg/ADMT) of fiber, was used to remoisturize cured fibers, by spraying the solution into an air stream containing the cured fibers.

The polyacrylic acid crosslinked cellulosic fibers were cured in a curing bin at temperature of about 182° C. (360'F) for about 4.5-5 minutes.

Post-treatment furfural levels of the samples, determined by the GC-FID procedure described in Example 1, are shown in Table 3, below.

TABLE 3

| Sample | Bleach treatment (lbs (kg)/ADMT) | | Amount of furfural (µg/g (ppm)) | | |
|---|---|---|---|---|---|
| | $H_2O_2$ | NaOH | Day 1 | Day 7 | Day 21 |
| 3A | 0.0 | 0.0 | 1.8 | — | — |
| 3B | 2.5 (1.13) | 0.0 | 1.507 | 1.307 | 1.163 |
| 3C | 3.5 (1.59) | 0.0 | 1.093 | 0.917 | 0.748 |
| 3D | 5.0 (2.27) | 0.0 | 0.760 | 0.570 | 0.393 |

Consistent with Examples 1 and 2, the furfural content of the treated samples decreased as the amount of hydrogen peroxide applied in the mill trial increased, comparing Day 1 values to that of the untreated control sample (3A), with reductions ranging from approximately 16.3% to approximately 57.8%.

With aging, the greatest amount of furfural reduction after Day 1 was observed at the 5.0 lbs/ADMT of fiber level, at approximately 48.3%. Furfural reduction at the lower levels was approximately 31.6% at the 3.5 lbs/ADMT (1.59 kg/ADMT) of fiber level, and approximately 22.8% at the 2.5 lbs/ADMT (1.13 kg/ADMT) of fiber level.

Overall, in the mill trial, the furfural reduction at Day 21 compared to the untreated control sample (3A) was approximately 35.4% in sample 3B (at 2.5 lbs/ADMT (1.13 kg/ADMT) of fiber), approximately 58.4% in sample 3C (at 3.5 lbs/ADMT (1.59 kg/ADMT) of fiber), and approximately 78.2% in sample 3D (at 5.0 lbs/ADMT (2.27 kg/ADMT) of fiber).

The bleached polyacrylic acid crosslinked cellulosic fibers produced in accordance with the present disclosure are suitable for incorporation into a variety of products, including, for example, paper boards, tissues, towels, and wipes, and personal care absorbent products, such as infant diapers, incontinence products, and feminine care products. Thus, in another aspect, the disclosure provides absorbent products including wipes, towels, and tissues as well as infant diapers, adult incontinence products and feminine hygiene products that include bleached polyacrylic acid crosslinked cellulosic fibers with reduced levels of furfural and accompanying malodor.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

The embodiments of the invention in which an exclusive property or privilege is claimed are defined as follows:

1. A method of reducing the furfural content of polyacrylic acid crosslinked cellulosic fibers, the method comprising:
    treating the polyacrylic acid crosslinked cellulosic fibers with hydrogen peroxide alone in the absence of sodium hydroxide, in a bleaching stage subsequent to a curing stage, to polyacrylic acid crosslinked cellulosic fibers, in an amount of from about 0.1 to about 20 pounds (about 0.045 to about 9.07 kg) per ADMT of fiber and at a hydrogen peroxide pH of between about 4.5 and about 5, wherein the hydrogen peroxide is applied to the polyacrylic acid crosslinked cellulosic fibers immediately after curing to form treated crosslinked fibers,
    baling the treated crosslinked cellulosic fibers before cooling from the curing process,
    measuring the furfural content of the treated crosslinked fibers, and
    wherein the amount of furfural in the treated crosslinked fibers reduces from a first value determined at one day after the treatment of the crosslinked fibers to a second, subsequent value determined at 12 days, 14 days, or 21 days after treatment.

2. The method of claim 1, wherein hydrogen peroxide is applied to the polyacrylic acid crosslinked fibers in an amount of from about 3.0 to about 10 pounds (about 1.36 to about 4.54 kg) per ADMT fiber.

3. The method of claim 1, wherein hydrogen peroxide is applied to the polyacrylic acid crosslinked fibers in an amount of about 5 pounds (2.27 kg) per ADMT fiber.

4. The method of claim 1, wherein the hydrogen peroxide is applied by spraying the hydrogen peroxide alone into an air stream containing the polyacrylic acid crosslinked fibers.

5. The method of claim 1, wherein the reduction of furfural from the first value to the second value is at least about 25%.

6. The method of claim 1, wherein the reduction of furfural is at least 55% at day 12 as compared to untreated polyacrylic acid crosslinked cellulosic fibers.

7. The method of claim 1, wherein aging of the treated crosslinked fibers to 12 days, 14 days, or 21 days occurs as the treated crosslinked fibers are baled and wrapped after hydrogen peroxide treatment.

8. The method of claim 1, wherein aging of the treated crosslinked fibers to 12 days, 14 days, or 21 days provides sufficient time for the hydrogen peroxide reduction of furfural content to reach equilibrium.

9. The method of claim 1, wherein the treated polyacrylic acid crosslinked cellulosic fibers have less than about 1.3 ppm furfural at day 12 as compared to untreated polyacrylic acid crosslinked cellulosic fibers.

10. The method of claim 1, wherein the hydrogen peroxide is applied by spraying the hydrogen peroxide alone into an air stream containing the polyacrylic acid crosslinked cellulosic fibers.

11. A method of reducing the malodor associated with the presence of furfural in polyacrylic acid crosslinked fibers comprising:
applying hydrogen peroxide, in the absence of alkaline agents, to the polyacrylic acid crosslinked fibers subsequent to curing the polyacrylic acid crosslinked fibers to form treated crosslinked fibers,
measuring the furfural content of the treated crosslinked fibers, and
reducing the furfural content of the treated crosslinked fibers by at least about 55% at 12 days after hydrogen peroxide application, compared to a furfural content of polyacrylic acid crosslinked fibers that have not been treated with hydrogen peroxide after curing, at day 0.

12. The method of claim 11, further comprising allowing the treated crosslinked fibers to age up to 21 days following the application of hydrogen peroxide.

13. The method of claim 12, wherein aging of the treated crosslinked fibers occurs as the crosslinked fibers are baled and wrapped following the application of hydrogen peroxide.

14. The method of claim 12, wherein aging of the treated crosslinked fibers to 12 days or 21 days provides sufficient time for the hydrogen peroxide reduction of furfural content to reach equilibrium.

15. The method of claim 11, wherein the pH of the hydrogen peroxide applied to the polyacrylic acid crosslinked fibers is between about 4.5 and about 5.

16. A method of producing an absorbent article comprising:
producing treated polyacrylic acid crosslinked fibers by performing the method of claim 1 and incorporating the treated polyacrylic acid crosslinked cellulosic fibers into an absorbent article selected from the group consisting of a diaper, an incontinence product, a feminine care product, a wipe, a towel, a tissue, and a paper board.

* * * * *